United States Patent
Hino

(10) Patent No.: US 9,847,592 B2
(45) Date of Patent: Dec. 19, 2017

(54) SENSOR

(71) Applicant: DENSO CORPORATION, Kariya, Aichi-pref. (JP)

(72) Inventor: Satoshi Hino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/384,731

(22) Filed: Dec. 20, 2016

(65) Prior Publication Data

US 2017/0179629 A1    Jun. 22, 2017

(30) Foreign Application Priority Data

Dec. 21, 2015 (JP) ................................. 2015-248533

(51) Int. Cl.
| | |
|---|---|
| H01R 13/24 | (2006.01) |
| H01R 13/428 | (2006.01) |
| G01M 15/10 | (2006.01) |
| H01R 13/405 | (2006.01) |
| H01R 13/33 | (2006.01) |

(52) U.S. Cl.
CPC ...... *H01R 13/2407* (2013.01); *G01M 15/104* (2013.01); *H01R 13/405* (2013.01); *H01R 13/428* (2013.01); *H01R 13/2464* (2013.01); *H01R 13/33* (2013.01)

(58) Field of Classification Search
CPC .............. H01R 13/2407; H01R 13/405; H01R 13/434; G01M 15/104; Y10S 439/942
USPC ............. 439/620.01, 871, 913, 942; 204/424
See application file for complete search history.

(56) References Cited

U.S. PATENT DOCUMENTS

| | | | | |
|---|---|---|---|---|
| 5,573,650 A * | 11/1996 | Fukaya | ................ | G01N 27/407 204/400 |
| 6,258,234 B1 * | 7/2001 | Watanabe | ............ | G01N 27/407 204/424 |
| 6,477,887 B1 * | 11/2002 | Ozawa | ............... | G01N 27/4075 204/424 |
| 6,843,105 B1 * | 1/2005 | France | .............. | G01N 27/4071 204/424 |
| 7,340,942 B2 * | 3/2008 | Matsuo | ............. | G01N 27/4062 73/31.05 |
| 7,563,118 B1 * | 7/2009 | McCauley | ........... | H01R 13/533 439/260 |
| 8,413,482 B2 * | 4/2013 | Kume | ................ | G01N 27/4077 73/23.2 |

(Continued)

*Primary Examiner* — Tulsidas C Patel
*Assistant Examiner* — Travis Chambers
(74) *Attorney, Agent, or Firm* — Nixon & Vanderhye P.C.

(57) ABSTRACT

A sensor includes contact springs placed in contact with electrode terminals on major surfaces of a sensor device. At least one of the contact springs includes a spring contact portion, a spring holding portion, a spring bent portion, and a spring connecting portion. The spring contact portion contacts an outer surface of one of the electrode terminals. The spring holding portion is turned from the spring contact portion and extends outside the spring contact portion so as to overlap the spring contact portion in the contacting direction. The spring bent portion is bent inwardly from the spring holding portion and extends at a given angle to the contacting direction. The spring connecting portion is bent from the spring bent portion and extends in the axial direction of the sensor. Such a structure enables the contact spring to be reduced in size and thickness without sacrificing a required mechanical strength thereof.

8 Claims, 4 Drawing Sheets

(56) References Cited

U.S. PATENT DOCUMENTS

| | | | |
|---|---|---|---|
| 8,636,532 B2* | 1/2014 | Masuda | G01N 27/4062 204/426 |
| 2001/0025522 A1 | 10/2001 | Kojima | |
| 2009/0223818 A1 | 9/2009 | Matsui et al. | |
| 2010/0139364 A1 | 6/2010 | Kume et al. | |
| 2010/0139379 A1 | 6/2010 | Kume et al. | |
| 2012/0097537 A1 | 4/2012 | Matsui et al. | |

* cited by examiner

SENSOR

CROSS REFERENCE TO RELATED DOCUMENT

The present application claims the benefit of priority of Japanese Patent Application No. 2015-248533 filed on Dec. 21, 2015, the disclosure of which is incorporated herein by reference.

BACKGROUND

1 Technical Field

This disclosure relates generally to a sensor designed to have a junction between an electrode terminal of a sensor device and a contact spring.

2 Background Art

Japanese Patent First Publication No. 2010-223615 teaches a gas sensor for use in measuring the concentration of a given gas component such as oxygen or NOx (nitrogen oxide) contained in exhaust emissions flowing through an exhaust pipe of an internal combustion engine. The gas sensor has a plurality of electrode terminals which are disposed on a sensor device and are connected to a plurality of electrical terminals in the form of contact springs joined to a plurality of lead wires, respectively. Each of the electrical terminals is made up of a terminal connecting portion which has a spring contacting one of the electrode terminals and a crimp portion which is joined to one of the lead wires.

The electrical terminals are retained inside a terminal cover member. The lead wires pass through holes formed in an elastic sealing member, respectively. The terminal cover member and the elastic sealing member are arranged inside a metallic protective cylinder. The elastic sealing member and the lead wires are retained by the protective cylinder which has a peripheral wall partially crimped to have a decreased diameter.

The crimping of the protective cylinder usually results in elastic deformation of the elastic sealing member, which leads to deformation of the lead wires. This causes external force to be exerted radially outwardly on a boundary between the terminal connecting portion and the crimp portion of each of the electrical terminals joined to the lead wires to bend the crimp portion. Tension stress arising from the bending of the crimp portion remains in the boundary.

When or after the gas sensor is installed in the exhaust pipe, the lead wires are usually pulled outside the gas sensor, so that such pulling acts on the boundaries in the form of tension stress. Two kinds of tension stresses are, therefore, simultaneously applied to the boundaries.

The simultaneous application of the tension stresses to the boundaries results in need for increasing the mechanical strength of the electrical terminals, thus resulting in difficulty in reducing the size or thickness of the electrical terminals. If, therefore, it is necessary to increase the electrical terminals and the lead wires, but the overall size of the gas sensor needs to be decreased, reduction in size or thickness of the electrical terminals requires changing how the stresses act on the electrical terminals.

SUMMARY

It is therefore an object to provide a sensor which has an electrical terminal capable of being reduced in size or thickness without sacrificing the mechanical strength of the electrical terminal.

According to one aspect of the disclosure, there is provided a sensor which comprises: (a) a sensor device which has a pair of device surfaces extending parallel to each other and a plurality of electrode terminals disposed on the device surfaces; (b) a plurality of contact springs which are placed in contact with the electrode terminals, respectively; (c) a plurality of lead wires which are joined to the contact springs, respectively; (d) a porcelain insulator which has the sensor device disposed therein and the contact springs retained therein; (e) a housing which has the porcelain insulator retained therein; (f) a cylindrical cover which is secured to an outer periphery of the housing, the cylindrical cover having a given length with a base end portion and a top end portion, the cylindrical cover including a small-diameter portion; (g) a bush which is arranged inside an inner periphery of the base end portion of the cylindrical cover closer to a base end of the cylindrical cover than the porcelain insulator is, the bush having formed therein a plurality of through-holes through which the lead wires pass, the bush being elastically compressed by the small-diameter portion of the cylindrical cover to develop retention of the lead wires in the through-holes; and (h) a specific contact spring that is at least one of the contact springs and includes a spring contact portion, a spring holding portion, a spring bent portion, and a spring connecting portion.

The spring contact portion is placed in contact with an outer surface of one of the electrode terminals in a contacting direction perpendicular to the device surfaces. The spring holding portion is turned from the spring contact portion and extends outside the spring contact portion in an axial direction of the cylindrical cover so as to overlap the spring contact portion in the contacting direction. The spring holding portion is retained by the porcelain insulator. The spring bent portion is bent inwardly from the spring holding portion and extends in a slant form in the contacting direction. The spring bent portion is retained by the porcelain insulator. The spring connecting portion is bent from the spring bent portion and extends in the axial direction. The spring connecting portion extends through a through-hole formed in the porcelain insulator toward the base end of the cylindrical cover and connects with one of the lead wires.

In the sensor, the spring bent portion of the specific contact spring is, as described above, bent inwardly from the spring holding portion extending in the axial direction of the cylindrical cover and extends in the slant form in the contacting direction perpendicular to the device surfaces of the sensor device. The spring bent portion is arranged to have a length extending substantially along the tangential line to the imaginary circle defined around the center of the cylindrical cover in the axial direction.

In the production of the sensor, the cylindrical cover is inwardly compressed to have the small-diameter portion for retaining the bush and the lead wires inside the cylindrical cover. This causes the bush to be inwardly compressed, thereby leading to deformation of the lead wires. The external force which deforms the lead wires will cause the spring connecting portion to be at least partially bent inward in the radial direction of the bush. This causes the external force working to bend the spring connecting portion to act from the spring connecting portion to the spring bent portion as an external force which works to twist the spring bent portion depending upon the configuration of the spring bent portion. Afterwards, the external force to twist the spring bent portion remains as residual stress in the spring bent portion.

When or after the sensor is installed in, for example, an exhaust pipe of an internal combustion engine, and the lead wires are pulled outside the sensor, an external force to pull each of the lead wires works as an external force to bend the spring bent portion through the spring connecting portion. The external force to bend spring bent portion acts as bending stress on the spring bent portion. This prevents both the external force which arises from the compression of the cylindrical cover and the external force which arises from the pulling of the lead wires from acting as tensile stress on the spring bent portion. This results in a decreased risk that the mechanical strength of the spring bent portion of the specific contact spring on which the stress easily concentrates reaches an upper limit thereof, thereby enabling the specific contact spring to have a required mechanical strength. This permits the contact springs to be made of a wire rod and reduced in size or thickness thereof.

The sensor of this disclosure, as apparent from the above discussion, is engineered to ensure a required degree of mechanical strength of the contact springs and enable the contact springs to be reduced in size and thickness thereof.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
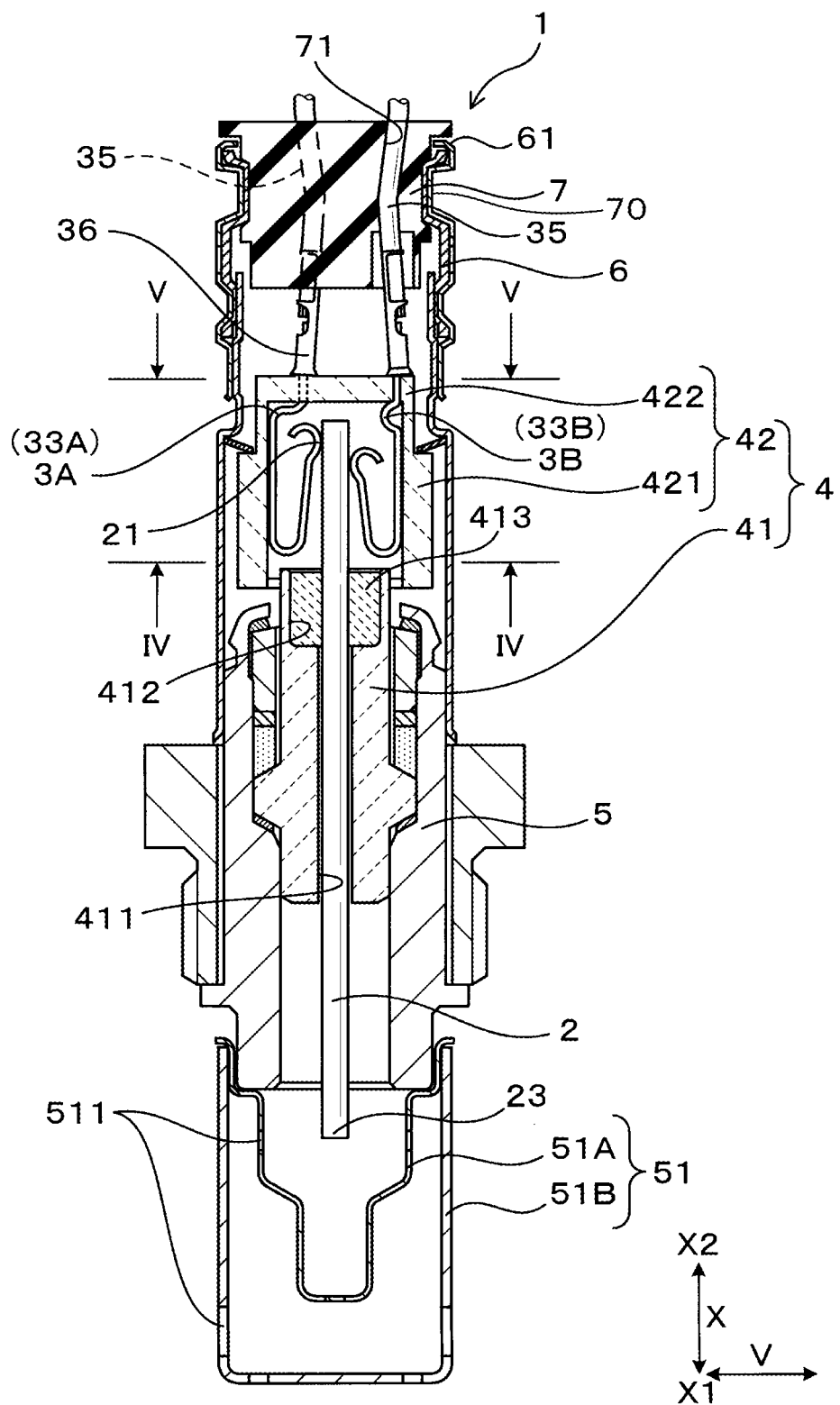
FIG. 1 is a longitudinal sectional view which shows a sensor according to an embodiment.

Referring now to the drawings, particularly to FIG. 1, there is shown the sensor 1 according to an embodiment.

The sensor 1, as illustrated in FIG. 1, includes the sensor device 2, a plurality of contact springs 3A and 3B, a plurality of lead wires 35, the porcelain insulator (also called a ceramic insulator) 4, the housing 5, the cylindrical cover 6, and the bush 7.

The sensor device 2 has major surfaces (which will also be referred to below as device surfaces) 22 which extend parallel to each other and are opposed through a thickness of the sensor device 2. The sensor device 22 also has a plurality of electrode terminals 21 disposed on the device surfaces 22, respectively. The contact springs 3A and 3B are placed in contact with the electrode terminals 21, respectively. The lead wires 35 are joined to the contact springs 3A and 3B, respectively. The porcelain insulator 4 has the sensor device 2 and the contact springs 3A and 3B retained therein. The housing 5 has the porcelain insulator 4 retained therein. The cylindrical cover 6 is secured to an outer periphery of the housing 5. The bush 7 is arranged inside the base end portion 61 which is one of ends of the cylindrical cover 6 opposed to each other in the axial direction X of the sensor 1. The bush 7 is located closer to the base end (i.e., an upper end, as viewed in FIG. 1) of the cylindrical cover 6 than the porcelain insulator 4 is. The bush 7 has a plurality of holes 71 through which the lead wires 35 pass, respectively. The lead wires 35 are firmly retained in the through-holes 71 by elastically inwardly compressing or crimping a portion of the cylindrical cover 6.

Figure 2:
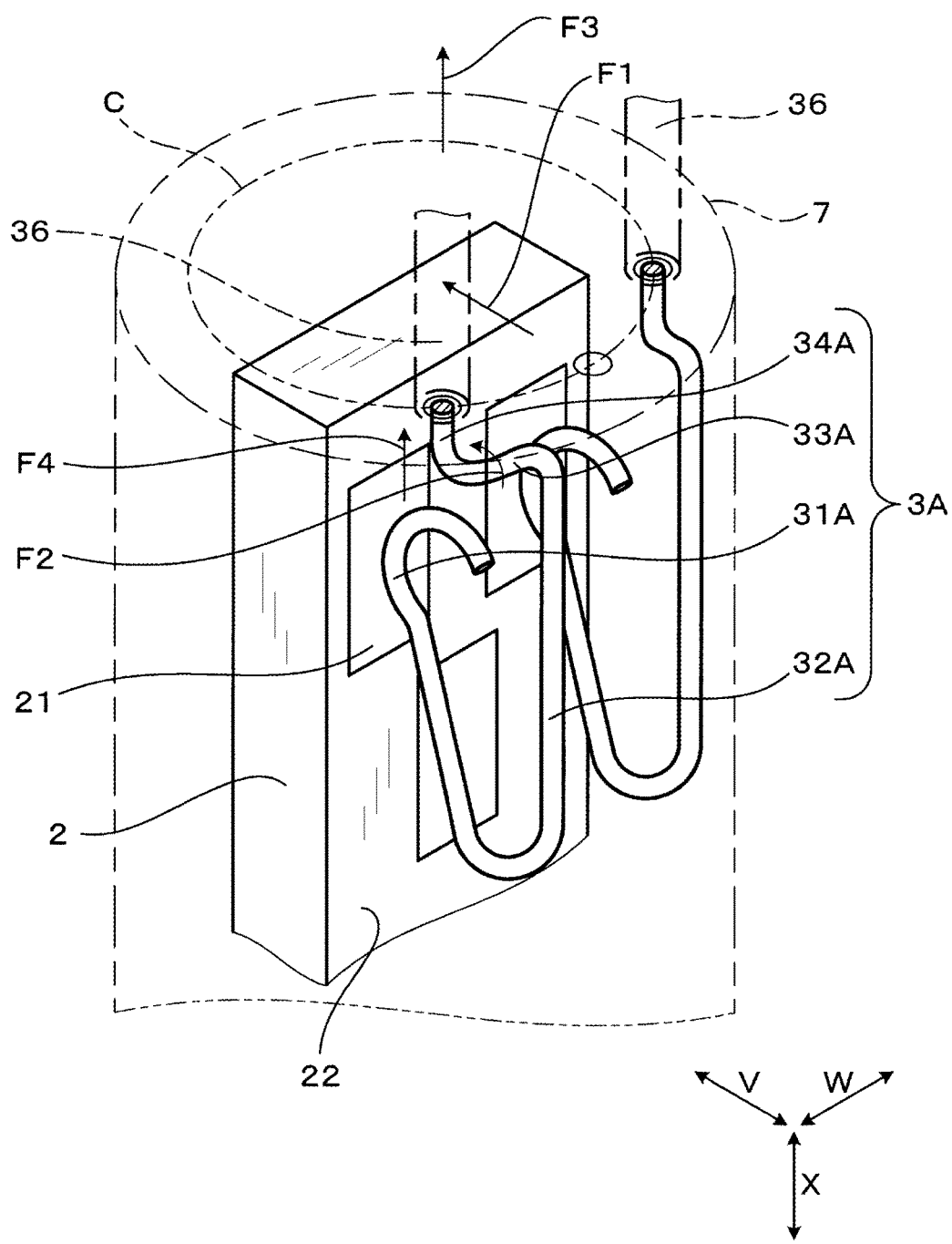
FIG. 2 is a partially perspective view which illustrates specific contact springs placed in contact with electrode terminals of a sensor device according to an embodiment.

Some of the contact springs 3A and 3B which will be referred to below as specific contact springs 3A in this disclosure, as illustrated in FIG. 2, each include the spring contact portion 31A, the spring holding portion 32A, the spring bent portion 33A, and the spring connecting portion 34A.

The spring contact portion 31A contacts an outer surfaces of a corresponding one of the electrode terminals 21 in a contacting direction V that is a direction perpendicular to the device surfaces 22. The spring holding portion 32A is turned from the spring contact portion 31A and extends, as viewed in FIGS. 1 and 2, outside the spring contact portion 31A in the axial direction X of the cylindrical cover 6. The spring holding portion 32A overlaps the spring contact portion 31A in the contacting direction V and is retained by the porcelain insulator 4. The spring bent portion 33A is bent inwardly from the spring holding portion 32A in the contacting direction V so that it slants at a given angle to the device surface 22. The spring bent portion 33A is retained by the porcelain insulator 4. The spring connecting portion 34A is bent from the spring bent portion 33A and extends in the axial direction X. The spring connecting portion 34A passes through the through-hole 421 in the porcelain insulator 4 and extends outside the base end of the porcelain insulator 4. One of the lead wires 35 is joined to the spring connecting portion 34A.

FIG. 2 represents the specific contact springs 3A placed in contact with corresponding ones of the electrode terminals 21 of the sensor device 2. Ones of the contact springs 3A and 3B other than the specific contact springs 3A which will also be referred to below as regular contact springs 3B are omitted from FIG. 2.

Next, the sensor 1 will also be described in detail.

The sensor 1, as referred to in this disclosure, is a gas sensor which is disposed in an exhaust pipe of an internal combustion engine mounted in an automotive vehicle and works to measure the concentration of oxygen or a given gas component contained in exhaust emissions flowing through the exhaust pipe.

Referring back to FIG. 1, A direction in which the sensor device 2 extends is the same as that in which the cylindrical cover 6 extends. Such a direction will be referred to as the axial direction X of the sensor 1. A side on which one of ends of the sensor 1 which are opposed to each other in the axial direction X lies will be referred to as a front end side X1 exposed to exhaust gas emitted from the internal combustion engine, while a side on which the other end of the sensor 1 lies will be referred to as the base end side X2. The contacting direction V perpendicular to the device surfaces 22 of the sensor device 2 is orthogonal to the axial direction X. FIG. 1 illustrates, as an example, one of the specific contact springs 3A on the left side where the regular contact springs 3B are omitted. FIG. 1 also illustrates one of the regular contact springs 3B on the right side where the specific contact springs 3A are omitted.

The sensor device 2 includes an oxygen-permeable solid electrolyte body and a plurality of electrodes affixed to surfaces of the solid electrolyte body. The sensor device 2 also has stacked therein a heater which faces and heats the solid electrolyte body. Some of the electrodes are exposed to a gas chamber into which the exhaust gas emitted from the internal combustion engine is drawn, while the other electrodes are exposed to a reference chamber into which air is drawn.

The sensor device 2 has a gas sensing portion 23 which is disposed on the front end side X1 and works to measure the concentration of NOx that is a given gas component of the exhaust gas using the electrodes. The heater is made up of a heating element which works to produce heat when electrically energized and a ceramic substrate in which the heating element is embedded. The electrode terminals 21 of the sensor device 2 connect with the electrodes and the heating element of the sensor device 2 through leads, not shown, and are, as described above, arranged on the device surfaces 22 on the base end side X2 of the sensor device 2.

The sensor device 2 is of a rectangular shape which has a given length extending in the axial direction X and a rectangular transverse cross section. The device surfaces 22 defines long sides of the rectangular transverse cross section.

The contact springs 3A and 3B in this embodiment, as can be seen in FIG. 1, include the specific contact springs 3A with the spring bent portions 33A and the regular contact springs 3B which do not have the spring bent portions 33A. Each of the contact springs 3A and 3B is formed by bending work. Each of the contact springs 3A and 3B is made of a metallic wire rod whose transverse cross section is circular in order to minimize the size and thickness thereof. Particularly, the use of the wire rod facilitates the ease with which the specific contact spring 3A is bent in a production line.

Figure 4:
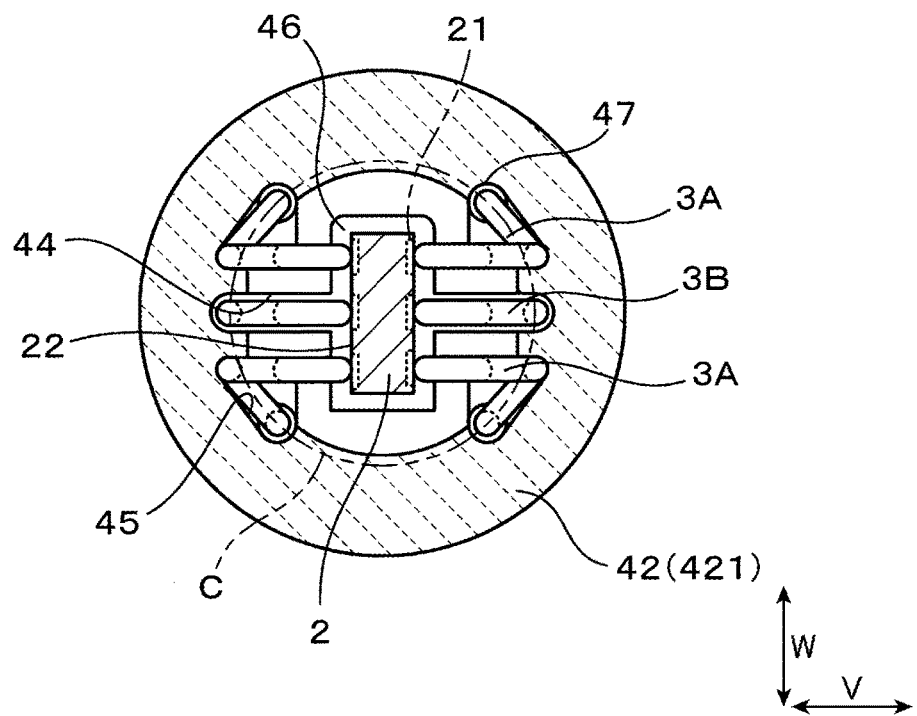
FIG. 4 is a transverse sectional view taken along the line IV-IV in FIG. 1.

The contact springs 3A and 3B are, as can be seen in FIG. 4, arranged at six places on the porcelain insulator 4. Specifically, the specific contact springs 3A are located at outer four of the six places on the porcelain insulator 4, while the regular contact springs 3B are located at middle two of the six places on the porcelain insulator 4. The specific contact springs 3A are arranged away from each other on each of the device surfaces 22 in the width-wise direction W that is perpendicular both to the axial direction X and to the 31A direction V. The specific contact springs 3A face corresponding ones of the electrode terminals 21.

Figure 3:
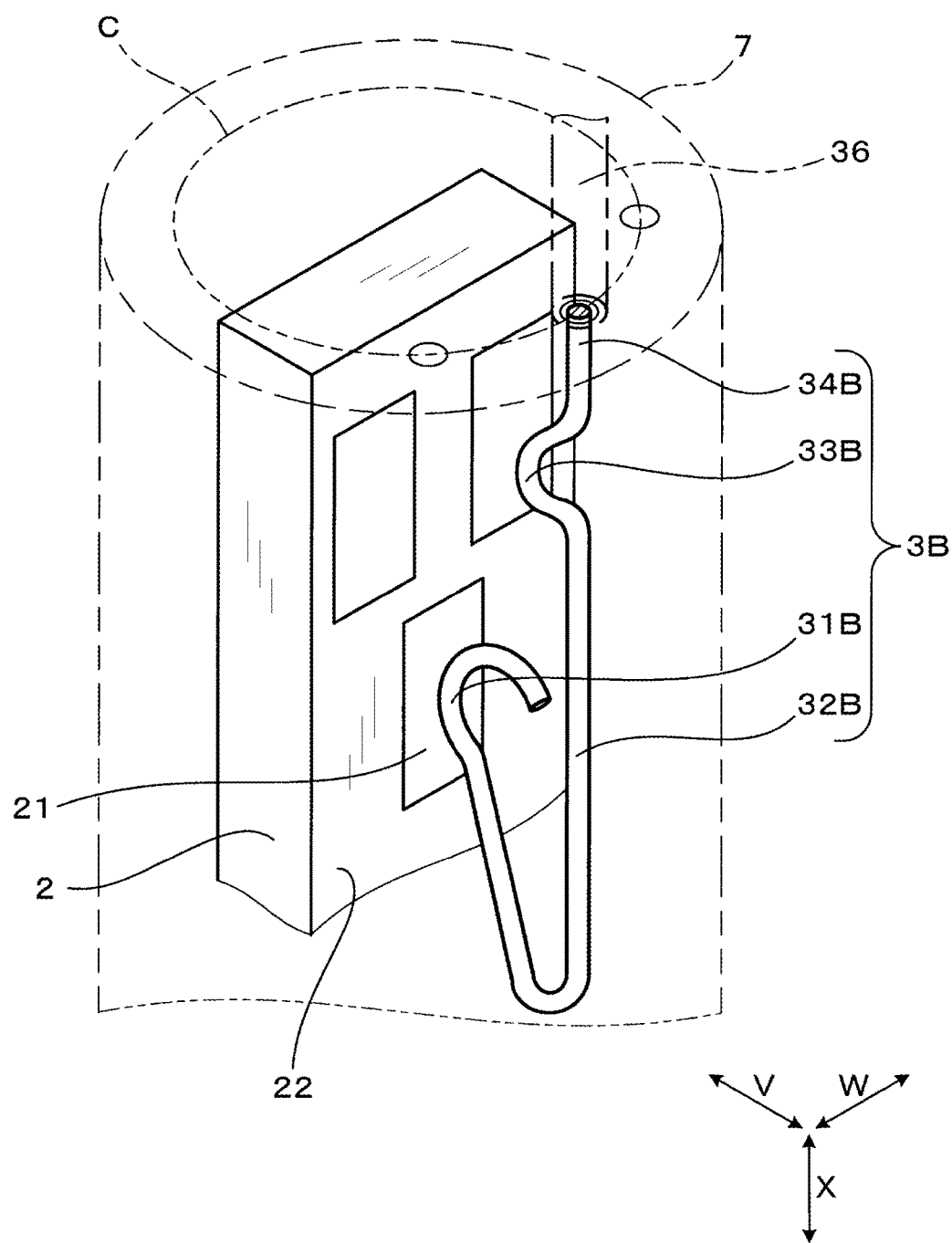
FIG. 3 is a partially perspective view which illustrates regular contact springs placed in contact with electrode terminals of a sensor device according to an embodiment.

Each of the regular contact springs 3B, as illustrated in FIG. 3, includes the spring contact portion 31B, the spring holding portion 32B, and the spring connecting portion 34B which are identical in configuration with the spring contact portion 31A, the spring holding portion 32A, and the spring connecting portion 34A of the specific contact spring 3A, respectively. Each of the regular contact springs 3B is partially two-dimensionally bent in the contacting direction V perpendicular to the device surfaces 22. The spring holding portion 32B and the spring connecting portion 34B of each of the regular contact springs 3B are joined together by the spring vertical bent portion 33B which protrudes in the contacting direction V perpendicular to the length of the spring holding portion 32B.

FIG. 3 illustrates one of the regular contact springs 3B placed in contact with a corresponding one of the electrode terminals 21 of the sensor device 2 and has the specific contact springs 3A omitted therefrom for the ease of visibility.

The spring contact portion 31A of each of the specific contact springs 3A is, as clearly illustrated in FIG. 2, bent from the tip (i.e., a lower end, as viewed in FIG. 2) of the spring holding portion 32A so that it is inclined to extend toward the sensor device 2 from the front end side (i.e., a lower end, as viewed in FIG. 2) to the base end side (i.e., an upper end, as viewed in FIG. 2) thereof at a given angle to the axial direction X. The spring contact portion 31A has the base end side placed in contact with the device surface 22 of the sensor device 2. The spring contact portion 31A is elastically deformable so as to change an interval between itself and the spring holding portion 32A. In other words, the spring contact portion 31A is urged by a spring load, as created by the elastic deformation thereof, into contact with the device surfaces 22.

The electrode terminals 21 of the sensor device 2 are formed on three areas of each of the device surfaces 22. The regular contact spring 3B is, as can be seen in FIG. 4, located at the middle of the width of each of the device surfaces 22 in the width-wise direction W. The specific contact springs 3A are disposed on opposite sides of the regular contact spring 3B. The spring bent portions 33A of the specific contact springs 3A extend along a tangential line to an imaginary circle C, as defined around the longitudinal center line of the cylindrical cover 6 extending in the axial direction X. In other words, each of the spring bent portions 33A is arranged to extend along a tangential line to the outer peripheral surface of the porcelain insulator 4, but may alternatively be oriented or inclined at an angle between, for example, plus and minus 15° to the tangential line to the outer peripheral surface of the porcelain insulator 4. The two specific contact springs 3A are arranged away from each other in the width-wise direction W to be symmetrical across each of the regular contact springs 3B, as viewed in the axial direction X.

The porcelain insulator 4 is, as illustrated in FIG. 1, an assembly of the first porcelain insulator 41 and the second porcelain insulator 42. The first porcelain insulator 41 retains the sensor device 2 with the gas sensing portion 23 protruding toward the front end side X1 and the electrode terminals 21 exposed outside it on the base end side X2. The second porcelain insulator 42 is located closer to the base end side X2 of the sensor 1 than the first porcelain insulator 41 is and retains the contact springs 3A and 3B therein.

The first porcelain insulator 41 has formed therein the center hole 411 which passes through the center axis of a length thereof and through which the sensor device 2 passes. The first porcelain insulator 41 also has the cylindrical chamber 412 which is formed in the base end thereof and communicates with the center hole 411. The cylindrical chamber 412 is filled with talc 413 to firmly retain the sensor device 2 in the center hole 411 of the first porcelain insulator 41. The second porcelain insulator 42, as illustrated in FIGS. 1 and 4, includes the cylindrical side wall 421 and the ceiling wall 422 which closes a base end opening of the side wall 421. The second porcelain insulator 42 has a plurality of holding grooves 44 which are formed in an inner surface of the side wall 421 and in which the spring holding portions 32A of the specific contact springs 3A and the spring holding portions 32B of the regular contact springs 3B are retained. The holding grooves 44 extend in the axial direction X. The side wall 421 of the second porcelain insulator 42 has the facing walls 45 formed on an inner periphery thereof. Each of the facing walls 45 has a surface inclined or oriented at a given angle to the contacting direction V so as to face one of the spring bent portions 33A. Each of the facing walls 45 serves to hold a corresponding one of the spring bent portions 33A when external pressure is exerted from the spring connecting portion 34A to the spring bent portion 33A.

The spring contact portions 31A and 31B, the spring holding portions 32A and 32B, and the spring bent portion 33A or the spring vertical bent portion 33B of each of the specific contact springs 3A and each of the regular contact springs 3B are disposed inside the side wall 421. The spring connecting portions 34A and 34B of each of the specific contact spring 3A and each of the regular contact spring 3B are drawn from the side wall 421 out of the ceiling wall 422 toward the base end side of the sensor 1.

The second porcelain insulator 42, as can be seen in FIG. 4, has the sensor mount hole 46 formed inside the side wall 421. The holding grooves 44 communicate with the sensor mount hole 46. The spring contact portions 31A and 31B of the specific contact springs 3A and the regular contact springs 3B contact with the electrode terminals 21 within the sensor mount hole 46.

Figure 5:
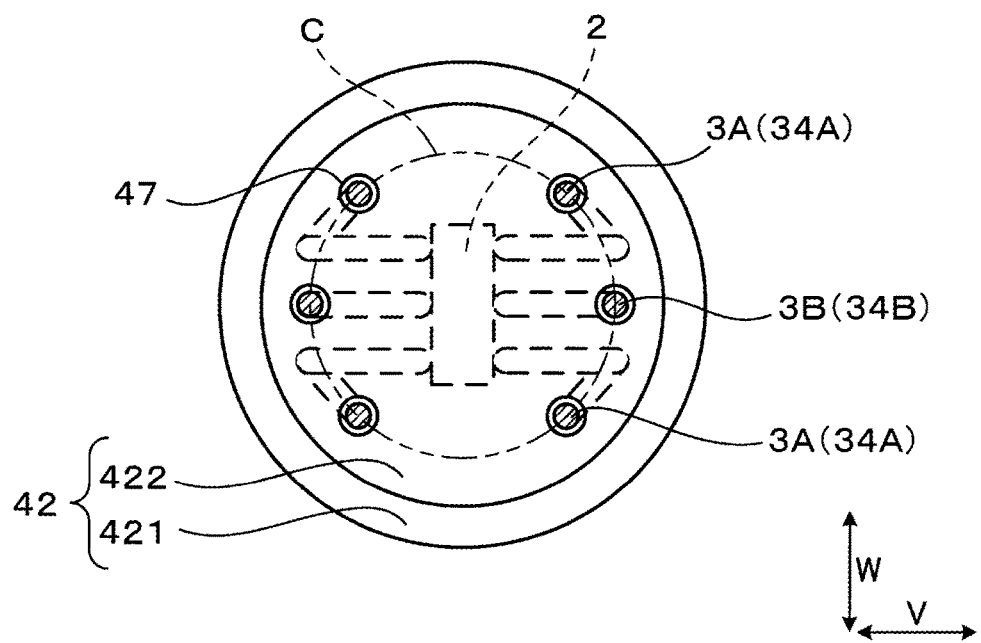
FIG. 5 is a transverse sectional view taken along the line V-V in FIG. 1.

The ceiling wall 422 of the second porcelain insulator 42, as illustrated in FIG. 5, has formed therein the through-holes 47 which extend in the axial direction X and through which the spring connecting portions 34A pass. When each of the specific contact springs 3A is pulled upward, as viewed in FIG. 1, through one of the lead wires 35, the ceiling wall 42 serves as a stopper to block the pulling out of the spring bent portion 33A of the specific contact spring 3A. Similarly, when each of the regular contact springs 3B is pulled upward through one of the lead wires 35, the ceiling wall 42 serves as the stopper to block the pulling out of the spring vertical bent portion 33B of the regular contact spring 3B.

Each of the spring connecting portions 34A and 34B of the contact springs 3A and 3B is, as illustrated in FIGS. 1 and 5, joined to one of the lead wires 35 through the connecting terminal 36. The lead wires 35 are connected to an external controller disposed outside the sensor 1. Each of the lead wires 35 is inserted into one of the through-holes 71 of the bush 7. The outer periphery of the cylindrical cover 6 is elastically crimped to have a small-diameter portion 70 which radially compresses the bush 7 to firmly retain in the through-holes 71 the lead wires 35 which are, as can be seen in FIG. 1, bent by the compression of the bush 7. Each of the spring connecting portions 34A and 34B of the contact springs 3A and 3B and each of the lead wires 35 are disposed on the imaginary circle C which is defined about the center of the cylindrical cover 6 in the axial direction X.

The bush 7 and the lead wires 35 are, as can be seen in FIG. 1, subjected to the elastic deformation of the base end portion 61 of the cylindrical cover 6 which results from the radially inward crimping of the base end portion 61, thereby hermetically sealing gaps between the through-holes 71 of the bush 7 and the lead wires 35 and between the bush 7 and the cylindrical cover 6. In the production of the sensor 1, the base end portion 61 of the cylindrical cover 6 is elastically crimped, so that it has a decreased diameter, thereby causing each of the lead wires 35 to be partially deformed through the bush 7 in a radially inward direction of the bush 7. This also causes the spring connecting portions 34A and 34B of the contact springs 3A and 3B and the connecting terminals 36 to be bent in the radially inward direction of the bush 7. External force arising from such bending is, thus, kept exerted from the spring connecting portions 34A and 34B to the spring bent portions 33A and the spring vertical bent portions 33B of the contact springs 3A and 3B after the sensor 1 is produced.

The housing 5 is of a hollow cylindrical shape and a portion of the sensor 1 for use in firmly securing the sensor 1 to the exhaust pipe of the internal combustion engine. The housing 5 has the sensor device 2 held therein through the first porcelain insulator 41. The protective cover 51 is installed on the outer periphery of a front end of the housing 5 to cover the gas sensing portion 23 of the sensor device 2.

The protective cover 51 is an assembly of the first protective cover 51A and the second protective cover 51B. The first protective cover 51 covers the gas sensing portion 23 of the sensor device 2. The second protective cover 51B surrounds the first protective cover 51A. The first protective cover 51A and the second protective cover 51B have formed therein gas holes 511 through which the exhaust gas (i.e., measurement gas) is admitted into or discharged from the protective cover 51. The contact springs 3A and 3B, the housing 5, the protective cover 51, and the cylindrical cover 6 are each made of a metallic member. The porcelain insulators 41 and 42 are made from ceramic. The bush 7 is made from rubber.

The operation and beneficial advantages of the sensor 1 will be described below.

In the sensor 1, the spring bent portion 33A of each of the specific contact springs 3A is, as already described, bent radially inwardly from the spring holding portion 32A extending in the axial direction X of the cylindrical cover 6 and extends in a slant form in the contacting direction V perpendicular to the device surfaces 22 of the sensor device 2. In other words, the spring bent portion 33A extends from the spring holding portion 32A toward the device surfaces 22 at a given angle to the contacting direction V. Specifically, the spring bent portion 33A is arranged to have a length extending substantially along the tangential line to the imaginary circle C defined around the center of the cylindrical cover 6 in the axial direction X.

In the production of the sensor 1, the inward compressing or crimping of the cylindrical cover 6 to have a decreased diameter to develop firm retention of the bush 7 and the lead wires 35 inside the cylindrical cover 6 will cause the bush 7 to be inwardly compressed, thereby leading to deformation of the lead wires 35. The external force F1 which, as demonstrated in FIG. 2, arises from the crimping of the cylindrical cover 6 to deform the lead wires 35 causes the spring connecting portion 34A to be at least partially bent inward in the radial direction of the bush 7. This causes the external force F1 working to bend the spring connecting portion 34A to act from the spring connecting portion 34A to the spring bent portion 33 as the external force F2 which works to twist the spring bent portion 33A depending upon the configuration of the spring bent portion 33A. Afterwards, the external force F2 remains as residual stress in the spring bent portion 33A.

When or after the sensor 1 is installed in, for example, the exhaust pipe of the internal combustion engine, and the lead wires 35 are pulled outside the sensor 1, the external force F3 to pull each of the lead wires 35, as demonstrated in FIG. 2, works as the external force F4 to bend the spring bent portion 33A upward through the spring connecting portion 34A. The external force F4 acts as bending stress on the spring bent portion 33A. Therefore, when each of the lead wires 35 is pulled upward, a combination of the twisting stress (also called torsional stress) and the bending stress will be exerted on the spring bent portion 33A. This prevents both the external force F1 which arises from the crimping of the cylindrical cover 6 and the external force F3 which arises from the pulling of the lead wire 35 from acting as tensile stress on the spring bent portion 33A. This results in a decreased risk that the mechanical strength of the spring bent portion 33A of each of the specific contact springs 3A on which the stress easily concentrates reaches an upper limit thereof, thereby enabling the specific contact spring 3A to have a required mechanical strength. This permits the contact springs 3A and 3B to be made of a wire rod and reduced in size or thickness thereof.

The sensor 1 of this embodiment, as apparent from the above discussion, is engineered to ensure a required degree of mechanical strength of the contact springs 3A and 3B and enable the contact springs 3A and 3B to be reduced in size and thickness thereof.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

For instance, each of the contact springs 3A and 3B may be made of a rod whose transverse cross section is of a polygonal shape such as square or hexagon with rounded corners.

What is claimed is:

1. A sensor comprising:
    a sensor device which has a pair of device surfaces extending parallel to each other and a plurality of electrode terminals disposed on the device surfaces;
    a plurality of contact springs which are placed in contact with the electrode terminals, respectively;
    a plurality of lead wires which are joined to the contact springs, respectively;
    a porcelain insulator which has the sensor device disposed therein, the porcelain insulator having a plurality of through-holes and each of the contact springs passes through a different one of the plurality of through-holes and is retained by the porcelain insulator;
    a housing which has the porcelain insulator retained therein;
    a cylindrical cover which is secured to an outer periphery of the housing, the cylindrical cover having a given length with a base end portion and a top end portion, the cylindrical cover including a small-diameter portion;
    a bush which is arranged inside an inner periphery of the base end portion of the cylindrical cover closer to the base end of the cylindrical cover than the porcelain insulator is, the bush having formed therein a plurality of through-holes through which the lead wires pass, the bush being elastically compressed by the small-diameter portion of the cylindrical cover to develop retention of the lead wires in the through-holes; and
    a specific contact spring that is at least one of the contact springs and includes a spring contact portion, a spring holding portion, a spring bent portion, and a spring connecting portion, the spring contact portion being placed in contact with an outer surface of one of the electrode terminals in a contacting direction perpendicular to the device surfaces, the spring holding portion being turned from the spring contact portion and extending outside the spring contact portion in an axial direction of the cylindrical cover so as to overlap the spring contact portion in the contacting direction, the spring holding portion being retained by the porcelain insulator, the spring bent portion being bent inwardly from the spring holding portion and extending in a slant form in the contacting direction, the spring bent portion being retained by the porcelain insulator, the spring connecting portion being bent from the spring bent portion and extending in the axial direction, the spring connecting portion extending through one of the through-holes of the porcelain insulator toward the base end of the cylindrical cover and connecting with one of the lead wires.

2. A sensor as set forth in claim 1, wherein the porcelain insulator has a holding groove which extends in the axial direction and in which the spring holding portion is retained and a facing wall which is inclined to the contacting direction so as to face the spring bent portion.

3. A sensor as set forth in claim 1, wherein the specific contact spring is disposed to face one of the electrode terminals arranged on the device surfaces and is disposed away from each of the other contact springs in a width-wise direction that is perpendicular to the contacting direction and the axial direction.

4. A sensor as set forth in claim 1, wherein the contact springs are each made of a metallic wire rod whose transverse cross section is circular.

5. A sensor as set forth in claim 1, wherein the spring bent portion extends transverse to the contacting direction when the sensor is viewed in the axial direction.

6. A sensor as set forth in claim 1, wherein the spring bent portion extends transverse to the contacting direction and transverse to a width-wise direction that is perpendicular to the contacting direction and the axial direction.

7. A sensor as set forth in claim 1, wherein the spring bent portion extends along a tangential line to an imaginary circle defined around a longitudinal center line of the cylindrical cover extending in the axial direction.

8. A sensor as set forth in claim 7, wherein the spring bent portion extends transverse to the contacting direction when the sensor is viewed in the axial direction.

* * * * *